United States Patent Office 3,157,650
Patented Nov. 17, 1964

3,157,650
AMIDES OF 2-ARYL-ETHANOIC ACIDS
Ernst Habicht, Schaffhausen, Switzerland, assignor to Cilag-Chemie Limited, Schaffhausen, Switzerland, a Swiss company
No Drawing. Filed Sept. 4, 1962, Ser. No. 221,330
12 Claims. (Cl. 260—247.1)

The present invention relates to new derivatives of 2-aryl-ethanoic acids.

Scope of the invention is to provide for new derivatives of 2-aryl-2-aminoalkylmercapto-ethanoic acids with valuable pharmaceutical properties.

The present invention relates particularly to amides of 2-aryl-2-aminoalkylmercapto-ethanoic acids of the general formula

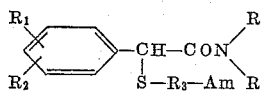

(I)

wherein $R_1$ and $R_2$ represent hydrogen, halogen, particularly chlorine or bromine, alkyl, alkoxy, alkylmercapto or together methylenedioxy, whereby the alkyl radicals in $R_1$ and $R_2$ shall contain together not more than 4 carbon atoms, and wherein $R_3$ represents a straight or branched alkylene containing from 2 to 4 carbon atoms in straight chain, and Am represents a secondary or tertiary amino group, particularly a lower monoalkylamino, dialkylamino, pyrrolidino, piperidino, morpholino and N'-alkyl-piperazine group, R represents hydrogen, an aliphatic, araliphatic or cycloaliphatic radical, such as for instance alkyl, alkenyl, alkanedienyl, alkynyl, alkanediynyl, cycloalkyl, cycloalkylalkyl, araky or wherein the group

represents pyrrolidino, piperidino, morpholino, or N'-lower alkylpiperazino, whereby the group

shall contain not more than 12 carbon atoms, preferably not more than 8 carbon atoms.

The present invention thus relates to amides of 2-aryl-2-sec.- and -tert.aminoalkylmercapto-ethanoic acids.

The present invention likewise relates to the acid addition salts of the new 2-aryl-ethanoic acid amides of the Formula I and to the quaternary salts as well as to the sulfoxides of such compounds, whereby the anion of such salts shall be physiologically compatible, i.e., it shall be indifferent.

The new derivatives of the Formula I and their acid addition salts and their quaternary salts as well as their sulfoxides have a strong spasmolytical effect, act sedatively and analgetically and can, depending on their constitution, be used as tranqualizers or psychoenergizers.

It was also found that the amides of such 2-aryl-ethanoic acids have an anti-inflammatory effect. In combination with the analgetical properties inherent in them they represent valuable remedies in the treatment of rheumatic and arthritic troubles.

It is to be stressed here that regarding the constitution no strict coincidence between analgetic and anti-inflammatory activity could be found.

The amides of the 2-aryl-2-sec.- and -tert.aminoalkyl-mercapto-ethanoic acids are easy to prepare. The most favorable process for their production consists of reacting an amide of a 2-hologeno-2-aryl-ethanoic acid of the formula

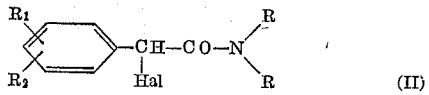

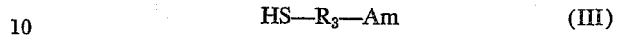

(II)

wherein Hal is chlorine or bromine, with a compound of the formula

HS—R$_3$—Am       (III)

When reacting an amide of a 2-phenyl-2-chloro- or -2-bromo-ethanoic acid with a thiol of the Formula III, there is preferably chosen a lower nitrile as solvent, for instance acetonitrile. The reaction proceeds slowly and has as a rule to be brought to an end by reflux heating lasting several hours.

In accordance with the methods described hereinbefore it is for instance possible to react the amide, methylamide, ethylamide, allylamide, sec.butylamide, tert.butylamide, dimethylamide, diethylamide, pyrrolidide, piperidide, morpholide, N'-methylpiperazide, di-propylamide, di-butylamide, benzylamide, p-methoxybenzylamide, 3,4-dimethoxybenzylamide, cyclohexylamide, cyclopentylamide, cyclobutylamide of 2-phenyl-2-chloro-ethanoic acid, etc. with methylaminoethanethiol, ethylaminoethanethiol, butylaminoethanethiol, dimethylaminoethanethiol, diethylaminoethanethiol, dipropylaminoethanethiol, pyrrolidinoethanethiol, piperidinoethanethiol, morpholinoethanethiol, 2(2',5'-dimethylpyrrolidino)-ethanethiol, 3-dimethylaminopropanethiol, 3-diethylaminopropanethiol, 3-pyrrolidinopropanethiol, 3-piperidinopropanethiol, 2-(2',6' - dimethylpiperidino) - ethanethiol, 2 - (2',4',6'-trimethylpiperidino) - ethanethiol, 3 - (2',5'-dimethylpyrrolidino)-propanethiol, 3-morpholinopropanethiol, etc., etc.

Instead of an amide of a 2-phenyl-2-halogeno-ethanoic acid unsubstituted in the phenyl it is likewise possible to use the amides of the following 2-aryl-2-halogeno-ethanoic acids: p-chloro- or p-bromophenyl-ethanoic acid, p-methoxy- or p-ethoxyphenyl-ethanoic acid, 2,4-dimethoxy- or 2,4-diethoxy-phenyl-ethanoic acid, 3-methoxy- or 3-ethoxyphenyl-ethanoic acid, 3,4-dimethoxy- or 3,4-diethoxyphenyl - ethanoic acid, 3,4 - methylenedioxy - phenyl-ethanoic acid, 3,4-dimethyl- or 3,4-diethylphenyl-ethanoic acid, and other similarly built 2-aryl-ethanoic acids.

The new amides of the 2-phenyl-2-sec. and tert. aminoalkyl-mercapto-ethanoic acids can likewise also be prepared in the following manner:

A lower alkyl ester of a 2-phenyl-2-sec. and tert. aminoalkylmercapto-ethanoic acid is treated in the heat with an alcoholic solution of ammonia or an amine

whereby amidation occurs.

The preparation of lower alkyl esters of 2-phenyl-2-sec. and -2-tert. aminoalkylmercapto-ethanoic acids is disclosed in my copending application Ser. No. 35,146, filed June 10, 1960, now Patent No. 3,080,415.

This is a continuation-in-part of my copending application Serial No. 35,146, filed June 10, 1960.

The new amides of 2-aryl-2-aminoalkylmercapto-ethanoic acids of the Formula I can be converted into a quaternary salt. For the quaternization can be used: lower alkylhalogenides, such as for instance methylbromide, methyliodide, ethylbromide, ethyliodide, allylbromide or allyliodide, crotyl bromide; or lower dialkylsulfates, such as for instance dimethylsulfate or diethylsulfate; or lower alkylesters or alkane-sulfonic acids, such as for instance methyl methanesulfonate, ethyl methanesulfonate; or esters of araliphatic alcohols, such as for instance benzylchloride, benzylbromide or phenethylbromide. It is essential that the anion of the quaternary salt be physiologically indifferent.

The conversion of the amides into their sulfoxides is accomplished in accordance with known methods, for instance by means of hydrogen peroxide in a cold mixture of glacial acetic acid and acetic acid anhydride, or in acetone as solvent.

When desiring to isolate the resulting amides of the 2-aryl-2-aminoalkylmercapto-ethanoic acids in form of their acid addition salts, the following acids can for instance be used: inorganic acids, such as sulfuric acid, hydrochloric acid, hydrobromic acid, phosphoric acid; or organic acids, such as for instance acetic acid, glycolic acid, citric acid, succinic acid, fumaric acid, maleinic acid, di-hydroxy-maleinic acid, methane-sulfonic acid, ethane-sulfonic acid, hydroxyethane-sulfonic acid, and others.

As a rule, the hydrochlorides and the citrates of the amides of the 2-aryl-2-aminoalkylmercapto-ethanoic acids crystallize very well. The citrates are obtained as dihydrogen-citrates in anhydrous form and can in this form be conserved without difficulties. They are usually prepared in acetone as solvent. They precipitate automatically or are precipitated as crystals by addition of ether. The hydrochlorides can easily be prepared by means of ethereal hydrochloric acid in ether or isopropanol as solvent.

*Example 1*

A solution of 23 g. of dimethylaminoethanethiol in 50 cc. of acetonitrile is given dropwise into a solution of 50 g. of ethyl 2-phenyl-2-bromoethan-1-oate in 100 cc. of acetonitrile. The whole is stirred vigorously, and the temperature rises automatically within 5 minutes to 50° C. After one hour the whole is set aside and after a few hours' standing it is treated with 100 cc. of 1 N glycolic acid. The acetonitrile and the water are distilled off in vacuo, the residue is taken up in 100 cc. of 2 N glycolic acid, and the acid aqueous solution is washed with ether and then rendered alkaline. The separating oil is taken up in ether, the ether dried over $K_2CO_3$ and then evaporated. The residue is distilled under high vacuum. There are obtained 42–43 g. of ethyl 2-phenyl-2-(2'-dimethylaminoethylmercapto)-ethan-1-oate. The new ester boils under 0.01 mm. at 118–119° C.

29.5 g. of this ester are shaken with 350 cc. of methanol, saturated at 0° C. with ammonia, in an autoclave at 100–105° C. for 6 hours. The reaction solution is then concentrated to one third and then triturated with 500 cc. of water. After cooling and inoculating crystallization sets in. The crystals are filtered off under suction, washed and dried. After recrystallization from benzene/petroleum ether there are obtained 18 g. of 2-phenyl-2-(2'-dimethylaminoethylmercapto)-ethanoic acid amide melting at 116–117° C.

In the same manner the 2-phenyl-2-(2'-diethylamino-ethyl-mercapto)-ethanoic acid amide is obtained; it melts at 103–104° C. The hydrochloride of this amide is prepared by means of ethereal hydrochloric acid, it melts at 185.5–187.5° C.

*Example 2*

66.5 g. of 2-phenyl-2-chloro-ethanoic acid chloride and 50 cc. of petroleum ether are given into a stirrer. To this solution are added dropwise while vigorously stirring and with outer ice cooling 100 cc. of ammonium hydroxide solution, which had been diluted with 300 cc. of water. Stirring is continued for one hour at 20° C., and the precipitating product is then filtered off with suction. The dried raw amide is recrystallized from hot benzene. There are obtained 47.5 g. of 2-phenyl-2-chloro-ethanoic acid amide (M.P. 116–118° C.).

25 g. of the thus resulting amide are dissolved in 180 cc. of acetonitrile. To this solution are added dropwise 19 g. of dimethylaminoethanethiol in 40 cc. of acetonitrile. When the light reaction subsides, the whole is heated to boiling for 5 hours. After cooling are added 300 cc. of 1.5 N acetic acid and the whole evaporated to dryness. The residue is treated with water, and the aqueous solution is shaken well with ether.

The aqueous phase is then rendered alkaline by means of saturated aqueous potassium carbonate solution, and the separating oil is taken up in chloroform. The chloroform layer is separated, dried and evaporated. The residue is recrystallized from benzene. There result 31.6 g. of 2-phenyl-2-(2'-dimethylaminoethylmercapto)-ethanoic acid amide, which melts at 116–117° C. It is little soluble in water and in petroleum ether, but readily soluble in the usual organic solvents and in dilute acids.

In analogous manner can be produced the diethylamino-ethylmercapto compound. It can be recrystallized from a mixture of benzene and petroleum ether and melts at 103–104° C. The new amide is practically insoluble in water and petroleum ether, but well soluble in dilute acids and in the usual organic solvents.

*Example 3*

In a manner analogous to that described in Example 2 are obtained from 35 g. of 2-phenyl-2-chloro-ethanoic acid-benzylamide (M.P. 94–95° C.) and 14.2 g. of dimethylaminoethanethiol in 270 cc. of acetonitrile after 5 hours' reflux heating 21 g. of 2-phenyl-2-(2'-dimethylaminoethylmercapto)-ethanoic acid benzylamide, which melts at 64–65° C. The citrate of the basic amide melts at 104–106° C. after having been recrystallized from acetonitrile/ether.

The diethylaminoethylmercapto compound, which melts at 73–73.5° C., is obtained in analogous manner in a yield of 91%.

*Example 4*

When heating 29 g. of 2-phenyl-2-chloro-ethanoic acid ethylamide (M.P. 99–100° C.) with 15.5 g. of dimethylaminoethanethiol in 230 cc. of acetonitrile and working up in the manner described in Example 2, 28.5 g. of 2-phenyl-2-(2'-dimethylaminoethylmercapto)-ethanoic acid ethylamide are obtained. The dihydrogencitrate of the new amide can be produced in acetonitrile by means of citric acid and melts at 87–89° C.

*Example 5*

When reacting 25 g. of 2-chloro-2-phenyl-ethanoic acid pyrrolidide with 14.2 g. of dimethylaminoethanethiol in 230 cc. of hot acetonitrile and working up in the manner described in Example 2, 17 g. of 2-phenyl-2-(2'-dimethyl-aminoethylmercapto)-ethanoic acid pyrrolidide are obtained. The new amide can be recrystallized from petroleum ether and melts, thus purified, at 45° C. Its citrate melts at 105–107° C.

*Example 6*

Heating to boiling of 33.6 g. of 2-phenyl-2-chloro-ethanoic acid ethylamide with 26.8 g. of diethylamino-ethanethiol in 240 cc. of acetonitrile leads to 45 g. of 2-phenyl-2-(2' - diethylaminoethylmercapto) - ethanoic acid ethylamide. The citrate of the new amide is recrystallized from acetonitrile/isopropanol and melts at 94–95° C.

*Example 7*

30 g. of ethyl 2-phenyl-2-(2'-diethylaminoethylmercapto)-ethanoate and 50 g. of anhydrous ethylamine in 350 cc. of methanol are heated to 100–105° C. for 18 hours. After cooling the obtained solution is evaporated on the water bath and the oily residue is treated with diluted acetic acid and ether. The aqueous acid solution is separated and rendered alkaline with potassium carbonate solution. The separating oil is taken up in ether. After drying the ethereal solution is evaporated and the residue is fractionated in the vacuum. There are obtained 12 g. of 2 - phenyl - 2 - (2' - diethylaminoethylmercapto)-ethanoic acid-N-ethylamide boiling under 0.01 mm. at 174–175° C. The citrate of this amide is obtained in isopropanol as solvent: it melts at 94–95° C.

17.6 g. of the citrate thus obtained are transferred into the free amide (10.1 g.) by means of sodium hydroxide solution; the free amide is dissolved in 120 cc. of acetone, adjusted to a pH value of 3.5 with the aid of 2 N hydrochloric acid. To this solution are added by drops and under ice-cooling 3.7 g. of 30% hydrogen peroxide. The whole is left standing for three days, and then evaporated to dryness at 20° C. The residue is treated with concentrated $Na_2CO_3$ solution. The separating oil is taken up in ether, the ethereal solution is treated with 6.3 g. of citric acid and boiled. The oily dihydrogen citrate of the sulfoxide, which separates when cooling, is reprecipitated from isopropanol/ether; it melts, thus purified, at 80–83° C.

*Example 8*

39.6 g. of 2-phenyl-2-chloro-ethanoic acid chloride are dissolved in 120 cc. of dioxane. This solution is added dropwise and under thorough stirring and cooling to a solution of 14.9 g. of pyrrolidine and 27.2 g. of ethyldiisopropylamine in 85 cc. of dioxane. After two hours the dioxane is distilled off in the vacuum, the residue is treated with water and the solid amide extracted twice with 250 cc. each of ethylacetate. The solvent is dried and evaporated and then recrystallized from benzene/petroleum ether. There are obtained 34 g. of a slightly yellowish 2-phenyl-2-chloro-ethanoic acid pyrrolidide, melting at 86–87° C. Reaction of 12.5 g. of the above mentioned pyrrolidide with 8.2 g. of diethylaminoethanethiol in 120 cc. of acetonitrile and working up, as described in the foregoing examples, results in 14 g. of 2-phenyl-2-(2'-diethylaminoethylmercapto)-ethanoic acid-pyrrolidide. The new pyrrolidide boils under 0.008 mm. Hg at 184–187° C. From the free base there can be prepared by means of citric acid in acetone solution the dihydrogen citrate which melts at 82° C.

*Example 9*

When reacting 20 g. of 2-phenyl-2-chloro-ethanoic acid-pyrrolidide with 12.9 g. of pyrrolidinoethanethiol in 185 cc. of acetonitrile and working up in the usual manner, there are obtained 23 g. of 2-phenyl-2-(2'-pyrrolidinoethylmercapto) - ethanoic acid-pyrrolidide. The new pyrrolidide melts, recrystallized from benzene/petroleum ether, at 92–93° C. From the base there can be prepared the hydrochloride by means of ethereal hydrochloric acid. The hydrochloride melts at 165–166° C. The maleinate is prepared in isopropanol/ether. It melts at 145–146° C. The dihydrogen citrate is prepared in the same way.

*Example 10*

By reacting 13.5 g. of 2-phenyl-2-chloro-ethanoic acid-pyrrolidide with 9.8 g. of morpholinoethanethiol in 130 cc. of acetonitrile and working up in the usual manner, there are obtained 12 g. of 2-phenyl-2-(2'-morpholinoethylmercapto)-ethanoic acid-pyrrolidide. The free base melts, recrystallized from benzene/petroleum ether, at 92–93° C. The hydrochloride is prepared in ethereal solution and melts, after recrystallization from ethanol/ether, at 153–155° C.

*Example 11*

By reacting 15 g. of 2-phenyl-2-chloro-ethanoic acid-pyrrolidide with 10.7 g. of piperidinoethanethiol in 140 cc. of acetonitrile there are obtained 22 g. of 2-phenyl-2-(2' - piperidinoethylmercapto)-ethanoic acid-pyrrolidide. The base forms a thickened, slightly yellowish oil, and is preferably isolated in form of the hydrochloride which melts at 171–173° C.

*Example 12*

A solution of 48.6 g. of 2-phenyl-2-chloro-ethanoic acid-chloride in 145 cc. of methylene chloride is added by drops under thorough stirring and cooling to a solution of 22.4 g. of morpholine and 33.2 g. of ethyldiisopropylamine in 100 cc. of methylene chloride. Further working up is performed in the usual manner. After recrystallization from benzene/petroleum ether there are obtained 53 g. of 2-phenyl-2-chloro-ethanoic acid-morpholide melting at 87–88° C.

When heating 15 g. of the ethanic acid-morpholide thus obtained with 7.25 g. of dimethylaminoethanethiol in 130 cc. of acetonitrile and working up in the usual manner, there are obtained 14 g. of the 2-phenyl-2-(2'-dimethylaminoethylmercapto)-ethanoic acid-morpholide, melting at 57–59° C. The hydrochloride of the base is prepared in a mixture of tetrahydrofuran/ether as solvent by means of ethereal HCl and melts, recrystallized from ethanol/ether, at 128–129° C.

*Example 13*

By reacting 15 g. of 2-phenyl-2-chloro-ethanoic acid-morpholide with 9.2 g. of diethylaminoethanethiol in 140 cc. of acetonitrile, there are obtained 21 g. of 2-phenyl - 2-(2'-diethylaminoethylthio)-ethanoic acid-morpholide melting at 58–59° C. The hydrochloride is prepared in ethereal solution and melts at 122–23° C.

*Example 14*

15 g. of 2-phenyl-2-chloro-ethanoic acid-morpholide are boiled with 9 g. of pyrrolidine-ethanethiol in 140 cc. of acetonitrile for 6 hours. Working up in the usual manner results in 17 g. of 2-phenyl-2-(2'-pyrrolidinoethylmercapto)-ethanoic acid-morpholide melting at 83–84° C. From the base there is prepared by means of ethereal hydrochloric acid the hydrochloride, which melts at 131–132° C.

*Example 15*

When reacting 15 g. of 2-phenyl-2-chloro-ethanoic acid-morpholide with 10.2 g. of 2-morpholinoethanethiol in 140 cc. of acetonitrile in the usual manner, there are obtained 17 g. of the 2-phenyl-2-(2'-morpholinoethylmercapto)-ethanoic acid-morpholide melting at 57–59° C., which can be recrystallized from petroleum ether. The hydrochloride of the base melts at 128° C.

*Example 16*

20 g. of 2-phenyl-2-chloro-ethanoic acid-morpholide are heated to boiling for 2 hours with 13.3 g. of 2-piperidinoethanethiol in 185 cc. of acetonitrile. The whole is worked up in the usual manner and yields the 2 - phenyl - 2-(2'-piperidinoethylthio)-ethanoic acid-morpholide in form of colorless crystals which melt at 64–65° C. The base can be recrystallized from benzene/petroleum ether. The hydrochloride of the base is prepared by means of ethereal hydrochloric acid and melts, recrystallized from ethanol/ether, at 147–148° C.

If 2 g. of the base are left standing for some days with 1 g. of methyliodide in 200 cc. of ethylacetate, then there is obtained the crystalline N-methoiodide. This can be recrystallized from absolute ethanol and melts, thus purified, at 199–200° C. under decomposition.

*Example 17*

In the same manner as described in Example 1, there is obtained from 33 g. of ethyl 2-(p-methoxyphenyl)-2-(2'-diethylaminomercapto)-ethan-1-oate and 390 cc. of methanol saturated with ammonia (6 hours, 100–105° C. in the autoclave) the 2-(p-methoxyphenyl)-2-(2'-diethylaminoethylmercapto)-ethanoic acid amide. After recrystallization from a mixture of benzene/petroleum ether the new amide melts at 95–97° C. The yield is 18 g. corresponding to 60% of the theoretical value. The hydrochloride of the base can be prepared by means of ethereal hydrochloric acid; it melts at 185–186° C.

What I claim is:

1. A compound selected from the group consisting of an amide of a 2-aryl-2-aminoalkylmercapto-ethanoic acid, its pharmaceutically acceptable acid addition salts and its sulfoxides, said amide being of the formula

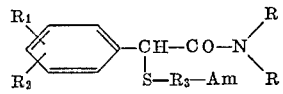

wherein $R_1$ and $R_2$ are members of the class consisting of hydrogen, chlorine, bromine, alkyl, alkoxy, alkylmercapto and together methylenedioxy, whereby $R_1$ and $R_2$ contain together not more than 4 carbon atoms, $R_3$ is alkylene from 2 to 4 carbon atoms, Am is a member of the class consisting of lower mono-alkylamine, di-lower alkylamino, pyrrolidino, piperidino, morpholino and N'-lower alkyl piperazino and

is a member selected from the class consisting of amino, mono-lower alkylamino, di-lower alkylamino, di-lower alkenylamino, mono-benzylamino, mono-cycloalkylamino, pyrrolidino, piperidino, morpholino and N'-lower alkylpiperazino containing not more than 12 carbon atoms.

2. A compound of the formula

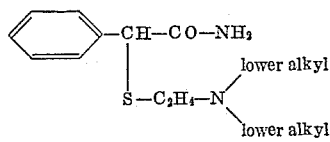

3. A compound of the formula

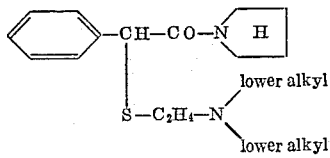

4. A compound of the formula

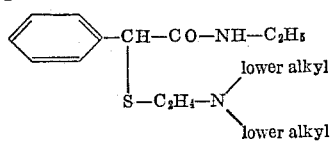

5. A compound of the formula

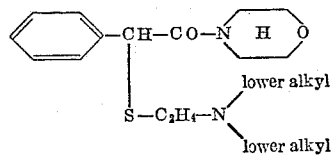

6. The compound of the formula

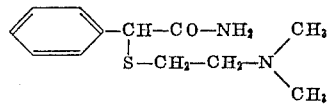

7. The compound of the formula

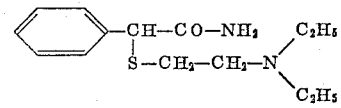

8. The compound of the formula

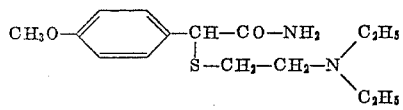

9. The compound of the formula

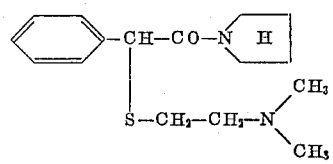

10. The compound of the formula

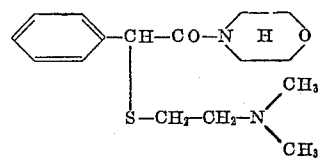

11. The compound of the formula

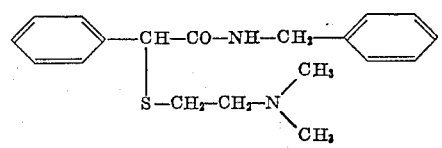

12. The compound of the formula

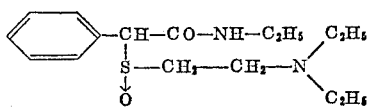

References Cited in the file of this patent
UNITED STATES PATENTS
3,080,415    Habicht _____ Mar. 5, 1963